June 4, 1946.   R. E. GLAVIN   2,401,299
MOLDING AND GLUING PRESS
Filed Oct. 3, 1942

WITNESS:
Robt P Litchel

INVENTOR
Robert E. Glavin
BY
Busser e Harding
ATTORNEYS.

Patented June 4, 1946

2,401,299

UNITED STATES PATENT OFFICE 2,401,299

MOLDING AND GLUING PRESS

Robert E. Glavin, Bristol, Tenn., assignor to Universal Moulded Products Corporation, Bristol, Va., a corporation of Delaware Application October 3, 1942, Serial No. 460,716

3 Claims. (Cl. 144—281)

This invention relates to improved apparatus for shaping or molding and gluing together laminations of material, as in the manufacture of plywood structures for the building of boats, airplanes, and the like.

It is well known that a plurality of laminations of thin wood veneer may be shaped or molded about a removable mold, and that by activating a thermo-responsive plastic adhesive interposed between the laminations the several plies may be bonded together to form a molded plywood structure that will retain indefinitely the form so given to it.

The present invention relates to improved apparatus for rapidly and conveniently carrying out the molding and gluing operations incident to the production of such molded plywood structures.

A preferred embodiment of the invention is shown in the accompanying drawing, in which.

Figure 1:
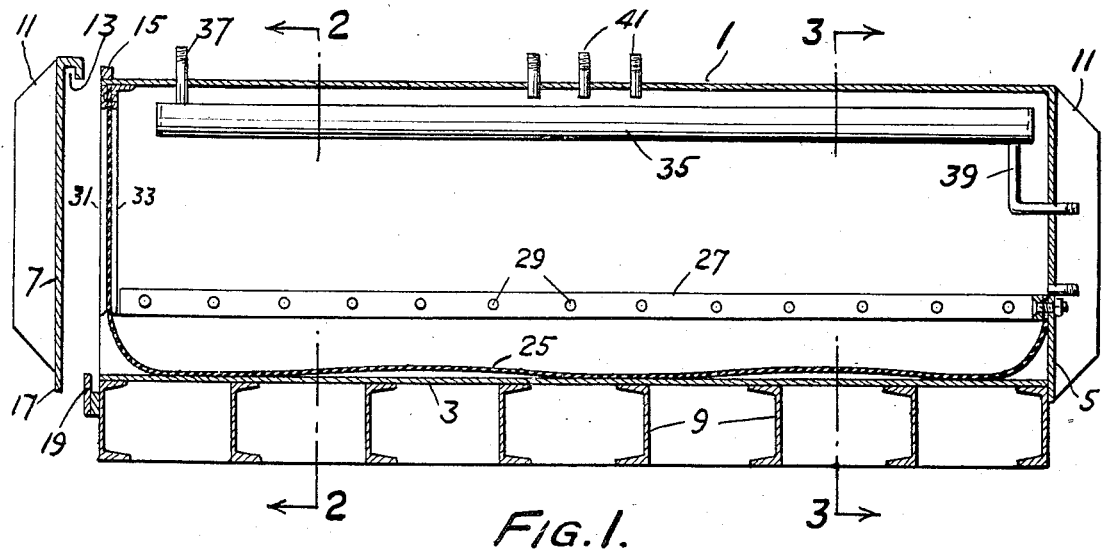
Figure 1 is a longitudinal sectional view through the molding and gluing press in accordance with this invention.
Figure 2:
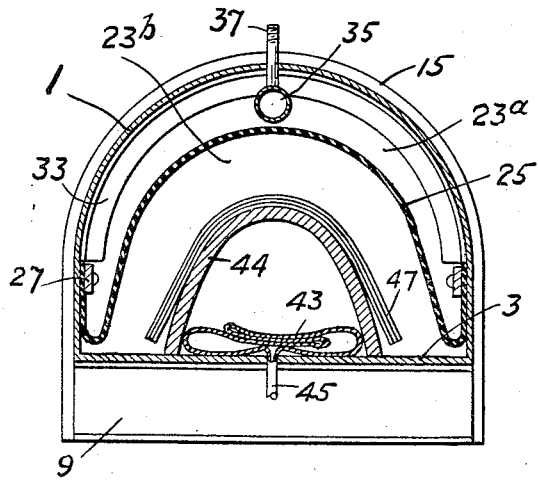
Figure 2 is a sectional view on the line 2—2 in Fig. 1, showing no pressure applied.
Figure 3:
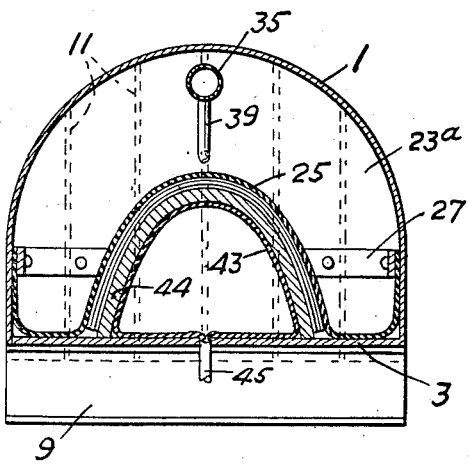
Figure 3 is a sectional view on the line 3—3 in Fig. 1, showing pressure being applied.

As shown in Figs. 1–3, the improved molding and gluing press in accordance with this invention comprises a chamber formed by a generally semi-cylindrical outer shell 1 and a plane floor 3, closed at one end by the wall 5 and adapted to be closed at the opposite end by a door 7.

Figure 4:
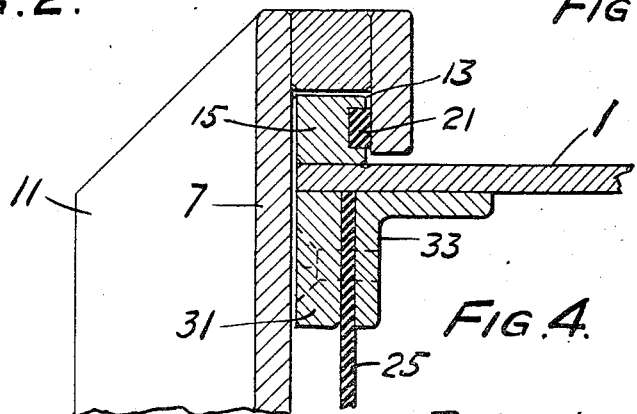
Figure 4 is a detail view of the door sealing means.

The floor 3 is stiffened and strengthened by a plurality of channel beams 9, while the rear wall 5 and door 7 are strengthened by a plurality of ribs 11. The door is designed to be retained in place by the engagement of its inwardly opening peripheral channel 13 with the bead 15 secured to the forward edge of the shell 1, and by the engagement of its lower edge 17 in the slot 19. A gasket 21 positioned in a recess in the rear face of the bead 15 (Fig. 4) serves to seal the door.

The chamber formed within the shell 1 is divided into two sections, 23a and 23b, by a heavy, impervious, flexible membrane 25 of rubber or similar material. The membrane 25 is tightly clamped to the shell 1 and the rear wall 3 by means of bands 27 and bolts 29, which extend along both sides of the shell 1 and the end wall 5 and is secured at the front of the chamber by being clamped between the semi-circular band 31 and a flange of an angle iron 33 welded to the inner surface of the shell 1. The angle iron 33 as well as the semi-circular band 31 between which the membrane is clamped extend from the band 27 at one side of the shell across the semi-circular top to the band 27 at the other side of the shell. The chamber 23a above the membrane 25 is thus entirely closed by the walls 1 and 5 and the membrane itself; while access may be had to the chamber 23b below the membrane 25 by removal of the door 7.

Positioned within the chamber 23a is a heater 35, through which steam may be circulated, as by conduits 37, 39. A plurality of conduits 41 lead directly into chamber 23a, which thus may be connected to water, compressed air, vacuum lines, etc. Positioned within the chamber 23b is an impermeable flexible bag 43, of rubber or similar material, the interior of which communicates with conduit 45.

In molding plywood, a plurality of plies of wood veneer 47 and interposed layers of adhesive are placed about and loosely conformed to a hollow mold or mandrel 44, of wood or metal. The mandrel 44 with the wood plies positioned upon it is then placed within the chamber 23b upon the floor 3. A vacuum may be drawn in chamber 23a to raise the membrane 25 up out of the way during this operation, as shown in Fig. 2. The mandrel 44 is so positioned that the bag 43 is covered thereby. The door 7 is then lowered into position to close the chamber, and air or other fluid under pressure is admitted to the chamber 23a, and to the bag 43.

The blanket 25 is thus forced down upon the wood veneer (Fig. 3), causing it to conform exactly to the shape of the mandrel, which is enabled to withstand the pressure exerted upon it because of the equal pressure exerted by the fluid in the bag 43. Heat required to activate the adhesive may be supplied from heater 35, or heated air, steam, or hot water may be admitted to chamber 23a and bag 43.

When the molding operation is complete (the temperature, pressure, and time factors for proper molding are known to the art), the chamber 23a and the bag 43 will be evacuated, the door 7 lifted, and the mold 44 and finished plywood structure removed.

It will be appreciated that this invention is not limited to the details of construction described above by way of illustration only.

What I claim and desire to protect by Letters Patent is:

1. Apparatus for molding and gluing comprising an open-ended container, a flexible, impermeable membrane extending generally lengthwise within said container and being secured at its lateral edges to the container above the bottom throughout the entire length of the edges, thereby forming within the container two chambers, the lower of which is accessible through the open end of the container, a closure for the open end of said container, fluid pressure and vacuum connections, respectively, through the container wall to the upper chamber of said container, a hollow mandrel in said lower chamber upon which material to be molded is positioned, a flexible, impermeable bag located within the mandrel, and a fluid pressure connection with the interior of the bag.

2. Apparatus for molding and gluing comprising an open-ended container, a flexible, impermeable membrane extending generally lengthwise within said container and being secured at its lateral edges to the side wall of the container and at its rear edge to the rear wall thereof, said membrane also extending upwardly adjacent the forward, open end of said container and being secured at its edge to the container wall from one side of the container across the top to the other side of the container, thereby forming within the container two chambers, the lower of which is accessible through the open end of said container; a closure for the open end of said container, fluid pressure connection through the container wall to the upper chamber of said container, a hollow mandrel in said lower chamber, a flexible, impermeable bag located within the mandrel and a fluid pressure connection with the interior of said bag.

3. Apparatus for molding and gluing comprising an open-ended container, a flexible, impermeable membrane extending generally lengthwise within said container and being secured at its lateral edges to the side wall of the container and at its rear edge to the rear wall thereof, said membrane also extending upwardly adjacent the forward, open end of said container and being secured at its edge to the container wall from one side of the container across the top to the other side of the container, thereby forming within the container two chambers, the lower of which is accessible through the open end of said container; a closure for the open end of said container, a flexible, impermeable bag located in said lower chamber, a fluid pressure connection thereto, and fluid pressure and vacuum connections, respectively, through the container wall to the upper chamber of said container, whereby a mandrel and material to be molded thereon can be placed in said lower chamber, and the material conformed to the mandrel by fluid pressure in the upper chamber acting through the flexible membrane.

ROBERT E. GLAVIN.